Feb. 14, 1950     C. M. LEE ET AL     2,497,174
TILE MAKING MACHINE

Filed May 23, 1947     2 Sheets—Sheet 2

INVENTORS.
Clarence M. Lee
Charles O. Lee
Oscar Lee
By Stowell & Evans
Attorneys Patented Feb. 14, 1950

2,497,174

UNITED STATES PATENT OFFICE 2,497,174

TILEMAKING MACHINE

Clarence M. Lee, Charles O. Lee, and Oscar Lee, Waseca, Minn., assignors to Lee Hydraulic Machinery, Inc., Waseca, Minn., a corporation of Minnesota Application May 23, 1947, Serial No. 750,070

4 Claims. (Cl. 25—36)

1

This invention relates to a machine for making hollow cylindrical tile, pipe, or the like from concrete, clay, or other plastic mixtures.

An object of the invention is to provide a power-operated tile-making machine wherein the means by which the make-ready operations and final operations in the manufacture of tile are operable and controllable independently of the means for actually forming the tile.

Another object is to provide a tile-making machine wherein the power for rotating the forming ram or shell, and the power for advancing and retracting the ram through a tile mold are supplied by separate and independent power sources.

Another object is to provide a tile-making machine having great operating flexibility and controllability, whereby tile of a wide variety of sizes may be made on a single machine and wherein plastic mixtures of variable plasticity or workability may be employed with equal ease. In the machine of the invention, adjustments may be readily made in the speed of rotation of the ram and in the speed of advancement and retraction of the rotating ram through a tile mold.

Still another object is to provide a tile-making machine that is convenient to operate by virtue of the arrangement and placement of most of the parts of the machine below the tile-forming area in which the operators work.

Other objects are to provide a machine of the class described that is comparatively simple in construction; that has a minimum of gears; that may have, and preferably does have, hydraulic means for advancing and retracting the ram; and wherein the power for raising and lowering the ram is supplied by means directly in line with the path of the ram, whereby high efficiency, minimum wear, and low operating and maintenance costs are realized.

A still further object is to provide, in a machine as described, means for firmly holding a tile mold in molding position during the tile-forming portion of the operating cycle and for releasing the mold after the tile has been formed. Preferably, release and engagement of the tile mold is co-ordinated with other preliminary and final movements of parts of the apparatus.

Typically, the tile-making machine of the invention includes a tile mold support providing a bottom opening for the vertical passage of a forming ram therethrough, a forming ram mounted for rotation and for vertical reciprocation through said opening and through a tile mold on said support, said ram being of a size to effect substantial closure of said opening when

2 inserted therein, power-operated means for rotating said ram, second power-operated means for reciprocating said ram into and out of said mold from said closure position, and third power-operated means for reciprocating said ram and said second power-operated means to and from said opening. Preferably, the means for rotating the ram includes an electric motor driving the ram through a mechanical gear train. The second and third power-operated means referred to preferably take the form of hydraulic piston and cylinder devices and an independently driven pump supplies operating fluid thereto. There may also be provided means for holding a tile mold in molding position on the support including a reciprocally mounted mold engaging member movable to and from mold engaging position, and means actuated by operation of the third mentioned power-operated means for moving the member to and from mold engaging position.

The foregoing and other aims, objects, and advantages of the invention will be apparent from or set forth with greater particularity in the following detailed description of one embodiment thereof as shown in the accompanying drawings, in which.

Figure 1:
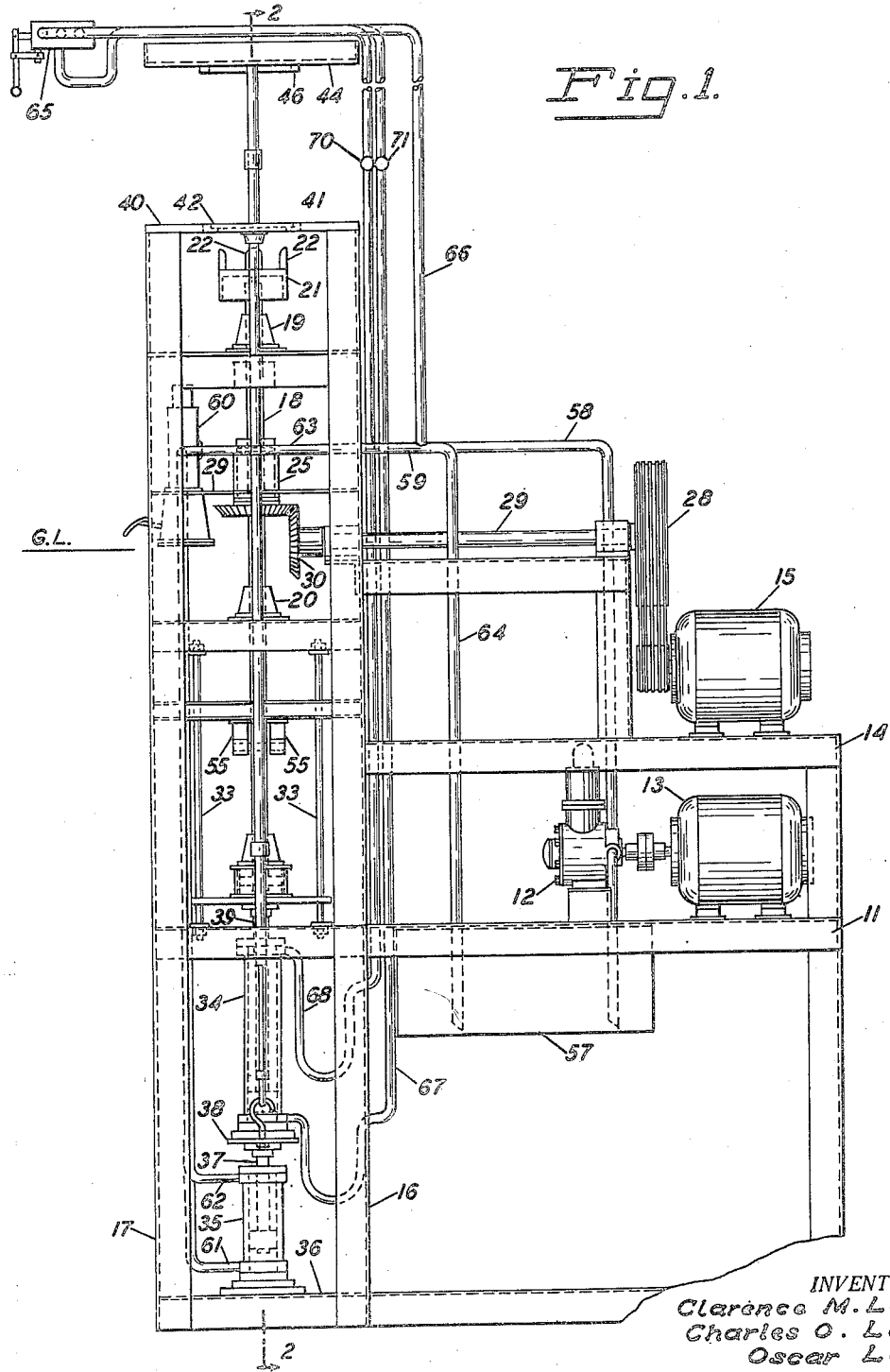
Fig. 1 is a side elevation of a tile-making machine in accordance with the invention.
Figure 2:
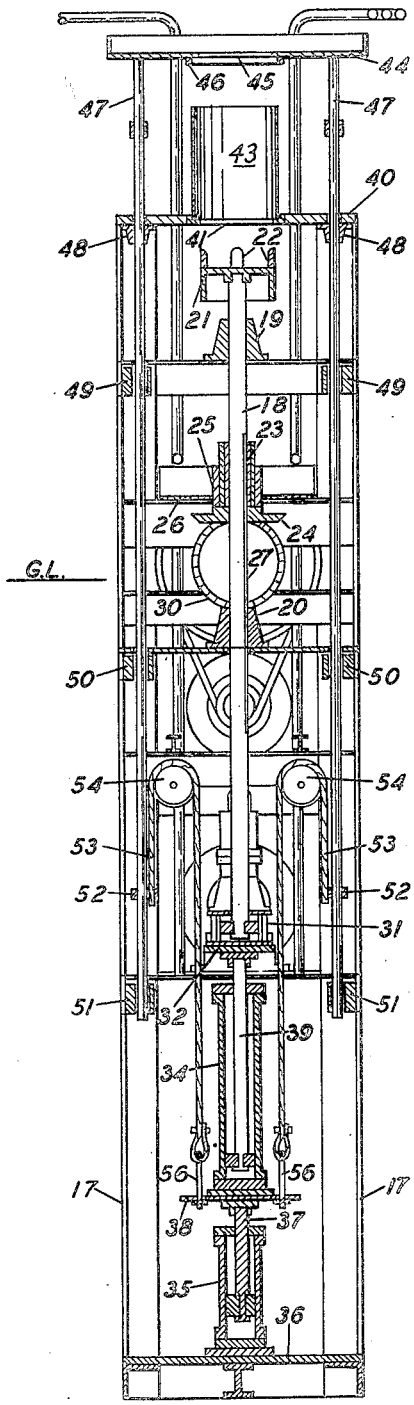
Fig. 2 is a sectional view taken along the plane of the line 2—2 of Fig. 1.

Referring particularly to Figs. 1 and 2 of the drawings, the tile-making machine shown has a main framework including a platform 11, supporting a pump 12 and pump motor 13, and a platform 14 on which is mounted the motor 15 for rotating the forming ram through means to be described. The main framework also includes upright members 16 and 17 defining a more or less open vertical shaft in which is carried the ram and means for reciprocating it. Conveniently, the machine is sunk in a pit or well, not shown, to the level of the ground-line G. L. to render the top or working zone of the machine more readily accessible to operators.

The forming ram has a vertical shaft 18 mounted in the framework in journals 19 and 20 which permit the shaft to rotate and to be moved axially. The head or tile forming element of the ram is a shell 21 of inverted cup formation screwed or otherwise suitably fixed to the top of shaft 9 for rotation therewith. The shell is provided with upstanding peripheral packing shoes 22 which assist in packing the concrete in a tubular mold through which the rotating ram is forced to form the central opening of a tile.

Splined or keyed to the shaft 18 by means of a key 23 is a bevel gear 24, which is mounted in a double thrust bearing 25 carried in a plate 26 forming a part of the framework. The shaft has an elongated keyway 27 permitting limited axial movement of the shaft in the hub of bevel gear 24. The bevel gear 24, and with it the shaft 18, is rotated by electric motor 15 through a multiple V-belt drive 28, shaft 29, and cooperating bevel gear 30.

The bottom of shaft 18 is supported in a side and double thrust bearing 31 fixed to a horizontal bearing support plate 32 which is freely movable in an up and down direction and is prevented from rotating by sliding engagement with the guide rods 33 carried by the framework.

Beneath the bearing support plate 32, and in axial alignment with the shaft 18, are two hydraulic piston and cylinder devices or lifts 34 and 35. These comprise the power-operated means for reciprocating the ram. The cylinder of the lower lift 35 is relatively short and is supported on the base 36 of the framework. Lift 35 is of the double-action type; its piston rod 37 supports a transverse plate 38 which is moved vertically by the piston rod 37 as actuated by the lift 35.

The plate 38 carries the upper lift 34. The latter is also of the double-action type and its piston rod 39 carries the previously described bearing support plate 32.

At the top of the main framework there is located a tile mold or tile jacket support 40 in the form of a horizontal plate provided with a centrally disposed circular opening 41 in alignment with the shaft 18 of the forming ram. The diameter of the opening is but slightly larger than the diameter of the shell 21 so that when the shell is within the opening, or the top of the shell is level with the opening, it forms an effective closure therefor. A recess 42, concentric with the opening 41, is provided in the top of plate 40 for the reception of a tile mold or jacket 43, as shown in Fig. 2.

Means for holding the tile jacket in molding position on the support 40 is shown as a top plate 44 having a central opening 45 through which the head of the ram may pass and through which a quantity of concrete mixture may be introduced to the tile mold. A ring 46 is affixed to the underside of the top plate 44 to engage the rim of the upper part of the jacket and hold it firmly in position.

The top plate 44 is carried by a pair of vertically slidable rods 47 mounted in bearings 48—49—50—51. Near the lower ends of the sliding rods, brackets 52 secure cables 53 to the rods. These cables are passed over pulleys 54 journalled in bearings 55 attached to the frame, and are brought down and secured to hooks 56 carried by the transverse plate 38.

It will thus be seen that upward movement of the piston of lower lift 35 will raise the upper lift 34 and the ram to a position where the shell 21 closes the opening 41. Such movement also lowers the top plate 44 into engagement with the tile mold 43 which has been placed in position. At this stage, a charge of concrete mixture may be poured into the mold 43 through the opening 45 without fear of any loss of concrete through the bottom opening 41. Now, if the piston of the upper lift 34 is raised, the ram, which is being rotated by the motor 15, will be forced upwardly through the mold and sufficiently beyond the top thereof to pack the concrete mixture in the jacket in the form of a hollow green tile.

Retraction of the piston of the upper lift will draw the shell back through the formed opening of the tile and will trowel the interior surface thereof.

Retraction of the piston of the lower lift 35 will lower the head of the ram from the opening 41 and will raise the top plate 44 to permit ready removal of the jacket and finished green tile contained therein and replacement thereof with another jacket to begin a new cycle.

Although suitable means for operating the hydraulic lifts 34 and 35 will occur to those skilled in the art of the light of the foregoing description, a particular hydraulic system used to advantage in the apparatus of Figs. 1 and 2 will now be described with reference to Figs. 3 and 4.

The variable flow liquid pump 12 draws hydraulic fluid, such as oil, from a reservoir 57 and delivers it under pressure to a main line 58. The oil then passes by way of pipe 59 to a four-way foot-operated valve 60 controlling the operation of the lower lift 35. With the valve 60 set as shown in Fig. 4, the pressure fluid flows through pipe 61 to the bottom of the cylinder of lift 35 causing the piston therein to rise. Fluid from the top of the cylinder returns to the reservoir 57 through pipe 62, valve 60, and pipes 63 and 64. With the valve 60 set as shown in Fig. 3, the piston of lower lift 35 is forced downwardly, the hydraulic fluid under presure following the path 59, 60, and 62 to the top of the cylinder, and the return fluid following the path 61, 60, 63, and 64 to the reservoir 57.

The operation of the upper lift 34 is under control of a hand-operated four-way valve 65. The path of fluid flow in raising the piston of lift 34, as shown in Fig. 4, is from the main line 58 through pipe 66, valve 65, and pipe 67 to the bottom chamber of lift 45. Return fluid flows from the top chamber of lift 34 through pipe 68, valve 65, pipe 69, and pipe 64 to the reservoir.

Figure 3:
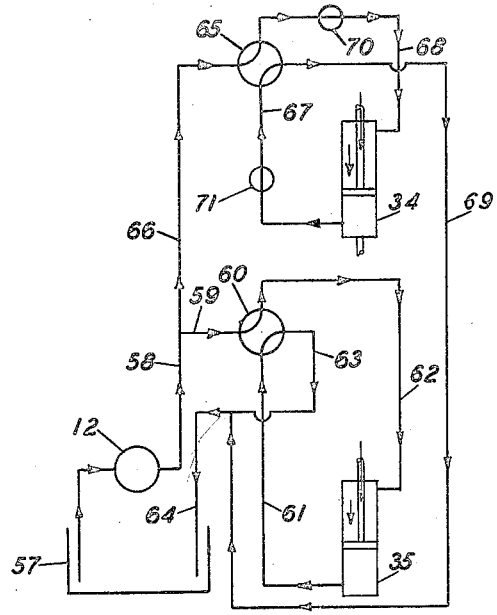
Figs. 3 and 4 are diagrams showing a preferred hydraulic system for the machine of Figs. 1 and 2.
Figure 4:
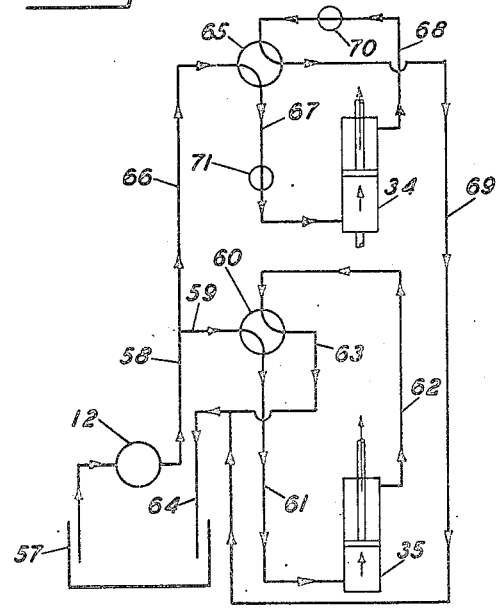

The operation of the hydraulic system to effect downward movement of the piston of upper lift 34 will be apparent from an inspection of Fig. 3.

It is generally desirable, in the interests of speed, that the head of the ram should return downwardly through the formed tile at a faster rate than that at which it was forced upwardly through the mold in forming the tile. In order to regulate these speeds, a manually adjustable valve 70, such as a globe valve, is placed in the pipe 68; this valve is adjusted to a rather wide opening to speed the downward travel of the piston of upper lift 34 when the four-way hand-operated valve 65 is set as shown in Fig. 3. The valve 71 in the line 67 should not appreciably throttle the returning liquid, and for this purpose is of a type that automatically opens wide when the liquid flows in the direction of the arrows of Fig. 3. Valve 71 also operates automatically to throttle the flow of liquid in the direction of the arrows of Fig. 4 to a preselected volume insuring the desired slow rise of the piston of lift 34. The rate of rise of the piston is so slow that the setting of globe valve 70 does not retard the return of liquid from the top of lift 34 to the reservoir 57.

From the foregoing description it will be seen that the present invention provides a tile-making machine in which the power for rotating the forming ram is independent of the power which raises and lowers the ram. This permits the operator to adjust the rotation of the ram to the speed required for making a tile of a particular diameter. The speed may be adjusted by the use of a variable speed motor 15 or by varying the ratio of the multiple V-belt drive 28.

It will be understood that jackets of different diameters may be accommodated in the machine by varying the size of recess 42 in the mold support 40 and the size of ring 46 on the underside of top plate 44. It will also be apparent that shells 21 of different diameters may be used in cooperation with suitably dimensioned bottom openings 41 in the mold support plate 40.

In the machine of this invention, the independent control of the lower lift 35 permits flexibility in regard to the time used in placing a jacket in position and removing the jacket and tile after formation of the latter. Such flexibility is desired because the time required for these operations will vary with the size of the tile being made.

Also, the speed of movement of the ram, as effected by upper lift 34, may be adjusted by means of valves 70 and 71 to the requirements of different sized tile and different plastic mixtures. It is advantageous that the operator may stop the upward movement of the ram at any time that damage to the equipment is imminent because of foreign matter, such as large stones, being inadvertently present in the molding mixture.

We claim:

1. A tile-making machine comprising a tile mold support providing a bottom opening for the vertical passage of a forming ram therethrough, means for restraining a tile mold in molding position on said support including a member for engaging the tile mold, said member being mounted for movement from a mold engaging position to a mold disengaging position, a forming ram mounted for rotation and for vertical reciprocation through said opening and through a tile mold on said support, said ram being of a size to effect substantial closure of said opening when inserted therein, power-operated means for rotating said ram, second power-operated means for reciprocating said ram between the point where said ram effects closure of said opening and a point above said opening in the formation of a tile, third power-operated means for reciprocating said ram and said second power-operated means between the point where said ram effects closure of said opening and a point below said opening, and means actuated by operation of said third power-operated means for moving said mold engaging member from mold engaging position to mold disengaging position.

2. A tile-making machine comprising a tile mold support providing a bottom opening for the vertical passage of a forming ram therethrough, means for restraining a tile mold in molding position on said support including a member for engaging the tile mold, said member being mounted for movement from a mold engaging position to a mold disengaging position, a forming ram mounted for rotation and for vertical reciprocation through said opening and through a tile mold on said support, said ram being of a size to effect substantial closure of said opening when inserted therein, power-operated means for rotating said ram, second power-operated means for reciprocating said ram between the point where said ram effects closure of said opening and a point above said opening in the formation of a tile, third power-operated means for reciprocating said ram and said second power-operated means between the point where said ram effects closure of said opening and a point below said opening, and mechanical linkage means actuated by operation of said third power-operated means for moving said mold engaging member to mold engaging position when said third power-operated means is moved to a position effecting closure of said opening and for moving said mold engaging member to mold disengaging position when said third power-operated means is moved to bring said ram to said point below said opening.

3. A tile-making machine comprising a tile mold support providing a bottom opening for the vertical passage of a forming ram therethrough, means for restraining a tile mold in molding position on said support including a member for engaging the tile mold, said member being mounted for movement from a mold engaging position to a mold disengaging position, a forming ram mounted for rotation and for vertical reciprocation through said opening and through a tile mold on said support, said ram being of a size to effect substantial closure of said opening when inserted therein, hydraulically operated piston and cylinder means for reciprocating said ram between the point where said ram effects closure of said opening and a point above said opening in the formation of a tile, and second hydraulically operated piston and cylinder means for reciprocating said ram and said first mentioned hydraulically operated piston and cylinder means between the point where said ram effects closure of said opening and a point below said opening, and means actuated by operation of said second hydraulically operated piston and cylinder means for moving said mold engaging member from mold engaging position to mold disengaging position.

4. A tile-making machine comprising a tile mold support providing a bottom opening for the vertical passage of a forming ram therethrough, means for restraining a tile mold in molding position on said support including a member for engaging the tile mold, said member being mounted for movement from a mold engaging position to a mold disengaging position, a forming ram mounted for rotation and for vertical reciprocation through said opening and through a tile mold on said support, said ram being of a size to effect substantial closure of said opening when inserted therein, hydraulically operated piston and cylinder means for reciprocating said ram between the point where said ram effects closure of said opening and a point above said opening in the formation of a tile, and second hydraulically operated piston and cylinder means for reciprocating said ram and said first mentioned hydraulically operated piston and cylinder means between the point where said ram effects closure of said opening and a point below said opening, means actuated by operation of said second hydraulically operated piston and cylinder means for moving said mold engaging member from mold engaging position to mold disengaging position, and independently driven pump means supplying hydraulic power to said piston and cylinder means.

CLARENCE M. LEE.
CHARLES O. LEE.
OSCAR LEE.

(References on following page)

REFERENCES CITED

The following references are of record in the file of this patent:

UNITED STATES PATENTS

| Number | Name | Date |
|---|---|---|
| 128,369 | Dickenson, Jr. | June 25, 1872 |
| 1,297,208 | McMurtrie | Mar. 11, 1919 |
| 1,412,046 | Dunn | Apr. 11, 1922 |
| 1,473,969 | Nichols | Nov. 13, 1923 |

FOREIGN PATENTS

| Number | Country | Date |
|---|---|---|
| 15,867 | Australia | Oct. 8, 1929 |
| 506,093 | Great Britain | May 23, 1939 |